Figure 1:
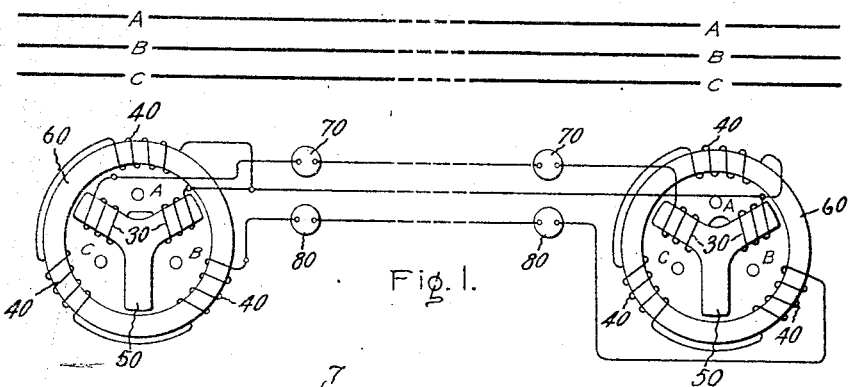

May 6, 1924.

H. TRENCHAM

METHOD AND APPARATUS FOR LINE PROTECTION

Filed Nov. 8, 1920

1,493,296

Inventor:
Henry Trencham,
by Albert G. Davis
His Attorney.

Patented May 6, 1924.

1,493,296

UNITED STATES PATENT OFFICE.

HENRY TRENCHAM, OF BELSAYE, RUISLIP, ENGLAND, ASSIGNOR TO GENERAL ELECTRIC COMPANY, A CORPORATION OF NEW YORK.

METHOD AND APPARATUS FOR LINE PROTECTION.

Application filed November 8, 1920. Serial No. 422,499.

*To all whom it may concern:*

Be it known that I, HENRY TRENCHAM, a subject of the King of Great Britain, residing at Belsaye, Ruislip, England, have invented certain new and useful Improvements in Methods and Apparatus for Line Protection, of which the following is a specification The invention relates to devices for protecting alternating current electric distribution systems in the event of faults to earth and faults between phases by automatically cutting out the faulty feeders, or sections of the system.

In the specification of British Patent No. 141,121 to British Thomson-Houston Co., Ltd. and E. B. Wedmore, there is described a protective device for alternating current electric distribution systems in which the input of electric energy into a section of the system is normally balanced against the output from said section and in which balancing devices which are relatively sensitive on faults to earth are combined with balancing devices which are relatively insensitive on faults between phases. A feature of the aforesaid protective device for use on a three phase system consists of a transformer having a three-legged inner core wound with secondary windings adapted to yield operating current on faults between phases and an outer core wound with secondary windings adapted to yield operating current on faults to earth, the outer core forming a shield for the air gaps of the inner core.

The present invention relates to improvements in such protective devices, particularly in relation to the arrangement of the relays and pilot wire system whereby the effects of capacity current and unbalancing of the transformer voltages arising in normal operation are prevented from cutting out sound sections of the systems.

According to my present invention I connect the secondary windings on the inner core in series with the secondary windings on the outer core and employ two pilot wires between the transformers at the two ends of the section for operating biased relays, the connections being so arranged that the capacity currents induced in the transformers are used to restrain the relays from operating when the section is sound. A third pilot wire between the transformers which is earthed is used as a return circuit.

In one practical example of my invention two biased relays are used at each end of the section and a pilot wire leading from the free end of the secondary windings on the outer core of one transformer passes through the operating coils of one pair of relays and the restraining coils of another pair of relays; another pilot wire connecting the points between the secondary windings of the inner and outer cores of the two transformers includes the restraining coils of the first mentioned pair of relays and the operating coils of the second mentioned pair of relays, a third pilot wire which connects the free ends of the windings on the inner cores of the two transformers, is earthed.

In a second practical example of my invention one biased relay only is used at each end of the section and a pilot wire connecting the two free ends of the secondary windings on the outer cores of the two transformers includes the operating coils of the relays, and the second pilot wire which is open-circuited between its ends includes the restraining coils of the relays.

My invention will be better understood from the following description taken in connection with the accompanying drawing, and its scope will be pointed out in the appended claims.

Figure 2:
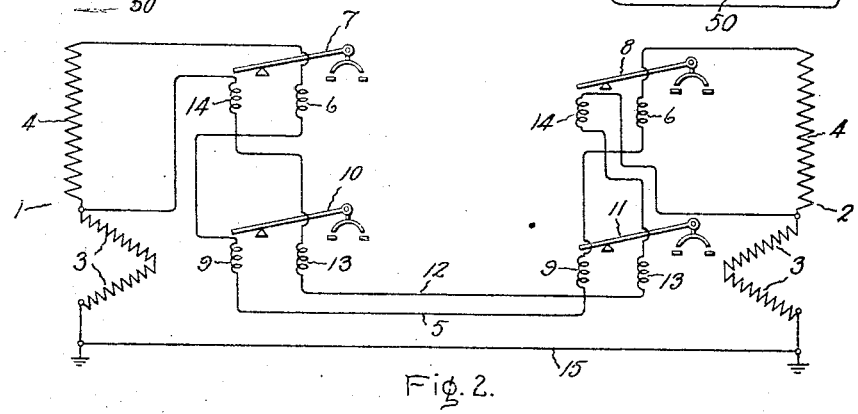
Figure 3:
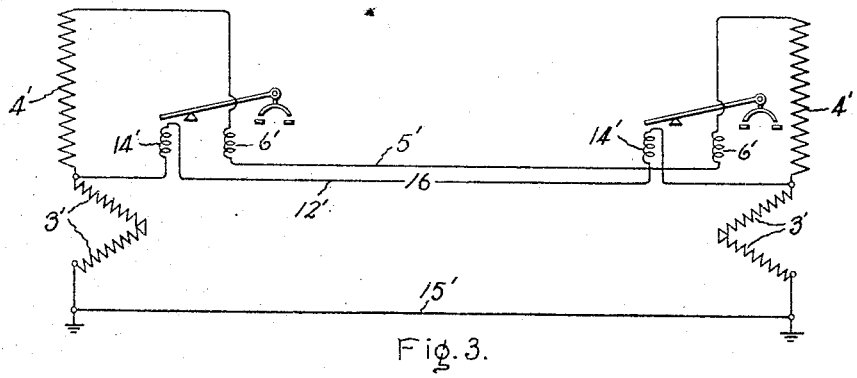
Figure 4:
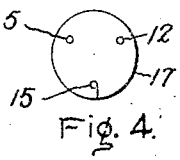

In the accompanying drawing, Fig. 1 is a diagrammatic representation of a protective system of the type described in British Patent No. 141,121 heretofore referred to; Fig. 2 is a diagrammatic representation of a protective system embodying transformers of the construction shown in Fig. 1 and protective relays arranged according to my present invention; Fig. 3 is a diagrammatic representation of a modification of my invention, and Fig. 4 is a diagram representing a section of the pilot cable.

Referring to Fig. 1, lines A—B—C represent the conductors of a three-phase distribution system, parts of three sections of the line being shown. Transformers comprising secondary windings 30 and 40 wound respectively upon inner and outer cores 50 and 60 are shown at each end of the middle section of the line ABC, and the transformers at the respective ends of this section are connected in opposition, all as described in the British patent referred to. Relays 70 and 80 are connected in the pilot wires and arranged to control protective apparatus, such as circuit breakers; the arrangement being such that the input to the section is normally balanced against the output of the section. As thus arranged, a fault between phases in the section to be protected develops an electromotive force in the secondary windings 30 of the transformer at the beginning of the section which overcome the electromotive force developed in the corresponding windings of the transformer at the end of the section so that a current is produced to operate the protective relays 70. A fault to ground in the section to be protected develops an electromotive force in the secondary windings 40 of the transformer at the beginning of the section by reason of the fact that the current carried by the conductors A—B—C is then unequal and this electromotive force produces a current to operate the protective relays 80. If a fault occurs between phases in a section beyond the section under consideration, that is to say, in a section fed through the section under consideration, the electromotive forces developed in the secondary windings 30 on the inner cores are equal and opposed, and this fact tends to prevent a flow of current through the relays 70, so that the section under consideration, which is sound, may not be disconnected. Other transformers and protective apparatus arranged in the section of the line in which the fault occurs, are relied upon to disconnect the faulty section. In like manner the secondary windings 40 on the respective transformers develop opposing electromotive forces which leave the relays 80 inoperative for faults occurring to ground on sections of the line beyond the section at which the transformers are located. While the relays 70 and 80 are thus intended to remain inoperative to disconnect sound sections of the line, nevertheless faults between phases develop such heavy currents that the electromotive forces developed in the secondary windings 30 corresponding to sound sections of the line give rise to an appreciable flow of capacity or charging current in the pilot wires, which currents may be so large as to operate the relays. Faults to ground do not develop correspondingly heavy capacity currents for the reason that the earth fault current will usually be limited by earthing resistances in the generating station.

Referring to Fig. 2, 1, 2 represents protective transformers of the type shown in Fig. 1, the windings on the inner cores being indicated at 3 and the windings on the outer cores at 4. The power lines are not shown in this figure. The windings 3, 4 are connected in series and the free ends of windings 4 are connected by a pilot wire 5 which contains the operating coils 6 of the pair of biased relays 7 and 8. Pilot wire 5 also includes the restraining coils 9 of the pair of relays 10 and 11. A second pilot wire 12 connects the junction points of the windings 3 and 4 and this pilot wire contains the operating coils 13 of relays 10 and 11 and the restraining coils 14 of relays 7 and 8. The relays 7 and 10 are at one end of the feeder or section protected by the apparatus and relays 8 and 11 are at the other end. In each relay means are provided for giving the restraining coils 9 and 14 a suitable preponderance over the operating coils 6 and 13 to allow for any slight unbalancing or lack of adjustment between the two transformers and normal irregularities in the power system. Such biased relays are well known in protective systems. The third pilot wire 15 which is earthed connects the other extremities of the secondaries of the two protective transformers.

The operation of the system is as follows:

*(1) Earth fault in the section protected by the apparatus.*

An earth fault in the section protected by the apparatus will cause an unbalancing of the voltages in secondary windings 4 and current will flow say from winding 4 of protective transformer 1 through pilot wire 5 passing through operating coils 6 and restraining coils 9 to windings 4 of protective transformer 2. Here the current divides part flowing through pilot wire 12 including operating coils 13 and restraining coils 14 back to winding 4 of protective transformer 1 and part flowing through winding 3 of protective transformer 2 pilot wire 15, winding 3 of protective transformer 1 back to winding 4. It will be seen that the whole of the current will flow through the operating coils 6 of relays 7 and 8 whereas only a part of the current will flow through the operating coils 13 of relays 10 and 11. Relays 7 and 8 will therefore operate to open the circuit breakers and isolate the section.

*(2) Fault between phases in the section protected by the apparatus.*

A fault between phases in the particular section protected by the apparatus will cause an unbalancing of the voltages in the secondary windings 3 of the two transformers and current will flow say from winding 3 of transformer 1 through pilot wire 12 including operating coils 13 and restraining coils 14. Current will also flow through windings 4 and pilot wire 5 including operating coils 6 and restraining coils 9. Both currents will return to winding 3 of transformer 1 by the pilot wire 15. It will be seen that the current flowing in pilot wire 5 is impeded by the reactance of windings 4 so that less current will flow through operating coils 6 than through operating coils 13. Relays 10 and 11 will therefore operate to open the circuit breakers and isolate the faulty section.

(3) *A fault to earth in a section of the system fed through the section protected by the apparatus.*

A fault to earth in a section of the system fed through the section protected by the apparatus will produce equal and opposite potentials in the windings 4 of the two transformers. No operating current will therefore flow through the relays and the circuit breakers will remain closed. Furthermore since, as heretofore pointed out, the earth fault current will be usually limited by means of the earthing resistances in the generating station, resistance of earth return, etc., the voltages induced in windings 4 will not be of sufficient magnitude to cause any trouble through capacity currents.

(4) *Fault between phases in a section of the system fed through the section protected by the apparatus.*

A fault between phases in a section of the system fed through the section protected by the apparatus will cause equal and opposite potentials to be induced in the windings 3 of the two protective transformers. These potentials may reach very high values because faults between phases or short circuits, as heretofore pointed out, as a rule result in much heavier currents flowing through the power cables than result from faults to earth. A considerable amount of capacity current will flow in the pilot wires 5 and 12 through the relays but it will be seen that the capacity current in each pilot wire passes through the operating coils of one pair of relays and the restraining coils of the other pair of relays. The high voltages induced in windings 3 will magnify any normal lack of adjustment between the transformers, but provided the restraining coils have been adjusted to have sufficient preponderance over the operating coils, the relays will not operate on account of capacity currents and lack of voltage balance. The circuit breakers will therefore remain closed.

The second example of my invention illustrated in Fig. 3 shows a simplified arrangement in which two relays only are employed one at each end of the section. In this case pilot wire 5′ includes the operating coils 6′ of the relays and pilot wire 12′, which is severed or open circuited at 16, includes the restraining coils 14′. In the event of faults to earth or between phases in the section protected current will flow from windings 4′ or 3′ respectively through pilot wire 5′ and operating coils 6′ returning through pilot wire 15′, thus causing the relays to operate and trip the circuit breakers. In the event of faults to earth or between phases in a section of the system beyond the system protected, capacity currents of substantially equal value will flow in the pilot wires 5′ and 12′ but the relays will not operate because of the preponderance in the adjustment of the restraining coils 14′.

Fig. 4 illustrates a cross section of the pilot wire cable containing pilot wires 5, 12 and 15, pilot wire 15 being connected to the sheath 17 which is earthed.

In the arrangement according to Fig. 2, a single relay at each end of the section can be employed leaving out relays 7 and 8 if the windings 4 are made of high impedance. This would entail some sacrifice in operating sensitiveness.

In accordance with the provisions of the patent statutes, I have described the principle of operation of my invention, and, while I have disclosed particular forms of apparatus which embody my invention, it is obvious to those skilled in the art that modifications and variations may be made, and I therefore aim to cover all such modifications and variations as fall within the scope of my invention as defined in the appended claims.

What I claim as new and desire to secure by Letters Patent of the United States, is:—

1. In an alternating current electric system, projective means wherein the input of electrical energy into a portion of the system is balanced against the output therefrom comprising a protective transformer at each of two points of the system, each of said transformers comprising inner and outer cores provided with windings connected in series and arranged in series relation to the system, pilot wires connecting the junction points and terminals of the windings of one transformer to the junction points and corresponding terminals of the windings on the other transformer, and a plurality of relays provided with restraining windings, one of said relays having its restraining winding in series relation with the pilot wire connecting the terminals of the windings on the outer cores of the transformers and another of said relays having its restraining winding in series relation with the pilot wire connecting the junction points of the windings of the transformers, whereby said relays are subject to a restraining effect proportional to the capacity current in the pilot wires.

2. A protective system of the class described wherein relays are arranged to control line protective apparatus installed at spaced intervals in the line so as to divide the line into sections and wherein protective transformers having secondary windings arranged to have electromotive forces developed therein in proportion to currents flowing in the line are provided to control said relays, and wherein pilot wires connected in circuit with the operating coils of the relays are arranged to connect the secondary windings of transformers near the respective ends of the line sections in opposed relation so that the input to a section is normally balanced against the output of the section, characterized by the fact that the relays are provided with coils connected in series relation with the pilot wires to restrain the operation of the relays and to exert a restraining force substantially proportional to the capacity current in the pilot wires.

3. In a protective system of the class described wherein projective apparatus is arranged at spaced intervals in a polyphase line so as to divide the line into sections, the combination of protective relays biased to inoperative position, a transformer having an inner core and an outer core arranged near each end of a line section, the inner core being provided with secondary windings arranged to develop an electromotive force upon faults between phases and the outer core being provided with a winding adapted to develop an electromotive force upon a fault to earth, the windings on the two cores of each transformer being connected in series, a pilot wire connecting the junction point of the inner and outer windings of one transformer to the junction point of the inner and outer windings of the transformer at the other end of the section, the free ends of the inner windings of each transformer being grounded and the free ends of the outer windings of each transformer being connected by a second pilot wire, each relay being provided with an operating coil connected in one pilot wire and a restraining coil connected in the other pilot wire.

4. In an alternating current electric system, protective means comprising a protective transformer at each of two points of the system, each of said transformers having inner and outer cores provided with secondary windings connected in series and arranged in series relation with the system, the windings on the inner core being arranged to develop an electromotive force on faults between phases and the windings on the outer core being adapted to develop an electromotive force on faults to earth, pilot wires interconnecting the windings on said inner and outer cores of one transformer with the corresponding windings on the other transformer for opposing electromotive forces, and biased relays provided with restraining and operating windings, one of said relays having its restraining windings in series relation with one of said pilot wires and its operating winding in series relation with another of said pilot wires, and another of said relays having its operating winding in series relation with the first mentioned pilot wire and its restraining winding in series relation with the second mentioned pilot wire, whereby operation of the relays by capacity current in the pilot wires is prevented.

In witness whereof, I have hereunto set my hand this nineteenth day of October, 1920.

HENRY TRENCHAM.

Certificate of Correction.

It is hereby certified that in Letters Patent No. 1,493,296, granted May 6, 1924, upon the application of Henry Trencham, of Belsaye, Ruislip, England, for an improvement in "Methods and Apparatus for Line Protection," errors appear in the printed specification requiring correction as follows: Page 3, line 97, claim 1, and page 4, line 16, claim 3, for the word "projective" read *protective;* same page, line 61, claim 4, for the word "windings" read *winding;* and that the said Letters Patent should be read with these corrections therein that the same may conform to the record of the case in the Patent Office.

Signed and sealed this 5th day of August, A. D. 1924.

[SEAL.]

WM. A. KINNAN,
*Acting Commissioner of Patents.*